United States Patent [19]

Paul et al.

[11] Patent Number: 5,253,105
[45] Date of Patent: Oct. 12, 1993

[54] SOLAR MIRROR, PROCESS FOR ITS MANUFACTURE AND ITS USE

[75] Inventors: Thomas Paul, Herne; Ingo Susemihl, Niederkassel, both of Fed. Rep. of Germany

[73] Assignee: Flachglas Aktiengesellschaft, Fuerth, Fed. Rep. of Germany

[21] Appl. No.: 938,030

[22] Filed: Aug. 28, 1992

[30] Foreign Application Priority Data

Aug. 29, 1991 [DE] Fed. Rep. of Germany ....... 4128645

[51] Int. Cl.$^5$ .......................... G02B 5/28; G02B 1/10
[52] U.S. Cl. .................................. 359/359; 359/360; 359/584; 437/166
[58] Field of Search .............. 359/350, 359, 360, 361, 359/584, 589, 590; 437/165, 166

[56] References Cited

U.S. PATENT DOCUMENTS

| | | | |
|---|---|---|---|
| 2,394,533 | 2/1946 | Colbert et al. | 359/584 |
| 2,590,906 | 4/1952 | Tripp | 359/584 |
| 2,647,441 | 8/1953 | Boydston et al. | 359/584 |
| 3,269,267 | 8/1966 | Collins | 359/359 |
| 3,531,313 | 9/1970 | Dates | 359/359 |
| 4,293,732 | 10/1981 | Rancourt et al. | 359/359 |
| 4,408,825 | 10/1983 | Stelmack | 359/360 |
| 4,714,308 | 12/1987 | Sawamura et al. | 359/360 |

FOREIGN PATENT DOCUMENTS

| | | |
|---|---|---|
| 0024900 | 3/1981 | European Pat. Off. |
| 970607 | 7/1949 | Fed. Rep. of Germany |
| 3004353 | 8/1980 | Fed. Rep. of Germany |
| 3214853 | 12/1982 | Fed. Rep. of Germany |
| 3902596 | 8/1990 | Fed. Rep. of Germany |

OTHER PUBLICATIONS

Eine neue hochbrechende Substanz für dielektrische Ultraviolett-Spiegel, Zeitschrift für Physik 156, 1959, pp. 117–124, Honcia et al.

Optical Properties of Zinc Sulfide and Cadmium Sulfide in the Ultraviolet, Journal of the Optical Society of America, Dec. 1956, vol. 46, No. 12, pp. 1013–1015, Hall, Jr.

Optical Materials Technology for Energy Efficiency and Solar Energy Conversion X, 1991, SPIE, vol. 1536, pp. 194–205, Jorgensen et al.

Optische Eigenschaften Dünner Schichten, "Chemie-anlagen+verfahren", Heft 7 und 8/69, Dec. 1969, Deutscher.

*Primary Examiner*—Martin Lerner
*Attorney, Agent, or Firm*—Nils H. Ljungman & Associates

[57] ABSTRACT

A mirror for systems for utilization of solar energy, with a substrate of low absorption flat glass and a rear highly reflective silver reflective layer is provided with a protective layer, a process for its manufacture and its use. In order to render this mirror usable for solar chemical energy utilization as well as to improve the energy yield overall, according to the invention the substrate is provided on its front with a high refractive index dielectric UV reflective layer of a thickness such that it acts as a reflection enhancing interference layer for the near UV region.

22 Claims, 3 Drawing Sheets

SOLAR MIRROR, PROCESS FOR ITS MANUFACTURE AND ITS USE

BACKGROUND OF THE INVENTION

1. Field of the Invention

The invention relates to a mirror for systems for utilization of solar energy, with a substrate of low absorption flat glass and a rear highly reflective silver reflective layer, which is provided with a protective coating, a process for its manufacture, and its use.

2. Background Information

Such a mirror is known for example from German Laid Open Patent Application DE-A 30 04 353. The glass substrate described there is normal flat glass which is made especially thin to reduce energy absorption. In practice as an alternative to this, white or high transmission glass is used for the substrate, which possesses significantly lower iron content than normal float glass and thus higher energy transmission. With mirrors of such a construction, reflection factors for solar energy of over 90% are achieved.

Another mirror is known from U.S. Pat. No. 4,511,618 entitled Laminated Reflective Panels, which corresponds to German Laid Open Patent Application DE-32 14 853 A 1, which relates to a laminated reflective panel comprising at least one mirror sheet which is less than 2.0 mm in thickness and which bears a reflective coating on its rear face. Each mirror sheet is laminated to a flat glass backing sheet which is thicker than the mirror sheet. The backing sheet is preferably made of float glass.

An article which relates to the optical properties of thin layers is found in "chemie-anlagen+verfahren" Heft 7 and 8/1969 in an article by Dr. Klaus Deutscher. This article relates to the optical properties of thin layers in regard to optical and opto-electronic devices This article further relates to thin layers used for the decrease of reflection and for the increase of reflection in the division of light in filters, masks and as polarizers built into such devices.

Mirrors of the generic type offer a series of advantages over other known solar mirrors. The use of the silver layer as reflective layer leads to efficiency levels when utilizing solar energy in solar heat systems which cannot be achieved with any other material. The disadvantage of the relatively high sensitivity of the silver layer to abrasion and corrosion is countered by the silver layer being located on the back of the substrate and being covered with a protective coating which usually comprises a copper layer as well as varnishing.

Alternatively or supplementary thereto, it is possible to provide in known fashion on the back of the silvered glass substrate an additional sheet of glass, metal, glass fibre reinforced plastic or the like, if this is required for protection of the silver layer or for stabilization of the mirror.

By using inorganic glass as substrate of the solar mirror, it is possible to achieve a service life of 20 years and more, even under extreme climatic conditions, the glass substrate—in contrast to the plastic substrate—not requiring any protection against the UV content of the solar radiation.

Mirrors of the aforementioned type are being used to an increasing extent for commercial utilization of solar energy in solar heat systems. One application takes the form of parabolic trough solar power stations, where cylindrically curved parabolic mirrors concentrate the solar energy onto tubes positioned along the focal line, in which circulates a heat transfer medium, which carries the heat absorbed to a generator station, where it is utilized for power generation.

Another application takes the form of solar tower power stations, where a number of plane mirrors direct the solar energy onto a "hot spot" on a tower, from whence the heat is dissipated via a high temperature heat transfer medium such as sodium and is also utilized for power generation.

The efficiency of solar heat systems is itself limited in optimum utilization of the solar energy for thermodynamic reasons. It would therefore be desirable to supply the solar rays directly to a utilization facility, that is to say without the diversion via process heat. A possibility to this end is offered by chemical processes. In the case of the so-called solar chemical utilization of solar energy, it is possible essentially to distinguish between three categories of chemical processes;

1. Generation of energy carrier media, e.g. hydrogen, synthesis gas, ammonia, methanol, aluminum.
2. Generation of primary materials, e.g. calcination of limestone, reduction of ores, desalination of water, production of carbon fibres, of nylon, of vitamin D.
3. Radiation induced reactions, e.g. the treatment of surfaces (alloy formation), decomposition of toxic substances, etc.

As with solar heat systems, it is necessary if possible with solar chemical systems to increase the energy density, for example by means of parabolically curved mirrors. It is important with the solar chemical processes mentioned for the reflectors to possess a high reflection factor, particularly in the short wave region of the solar spectrum. The reason for this is to be found in the fact that on the one hand, a series of chemical processes will only take place at all if a sufficiently high proportion of high energy, that is to say short wave radiation, is present. On the other hand, the thermodynamic quality of the electromagnetic radiation increases, the shorter the wavelength of the radiation is.

Attempts have already been made to provide solar mirrors for solar chemical processes which, in comparison with the rearsilvered glass mirrors of the generic type, possess an increased reflection factor in the UV region. In the case of these mirrors, aluminum is used for the reflective layer; this in contrast to silver possesses a sufficiently high reflection factor in the UV region. To prevent the UV content of the solar radiation being absorbed in the glass before even reaching the aluminum layer, it is necessary with these mirrors to apply the aluminum layer to the front of the substrate.

Such a configuration does in fact actually increase the reflection factor in the UV region. Locating the aluminum layer on the front reduces resistance to ageing and scratching however, even if the aluminum layer is covered with a dielectric protective layer. In addition, with the layer thicknesses usual and necessary, such a protective layer produces inter alia by interference undesirable reduction of the reflection factor of the aluminum layer in some regions of the spectrum. A further disadvantage is the lower overall solar reflection factor of aluminum, this amounting to several percent.

OBJECT OF THE INVENTION

The object of the invention is to develop a mirror of the generic type to the extent that a substantially increased reflection factor is achieved in the near UV region which is particularly significant for solar chemical applications, without thereby significantly reducing the reflection factor in the visible region of the spectrum, as well as for IR radiation. The mirror should be cost effective to produce and should possess a long service life.

SUMMARY OF THE INVENTION

This problem is solved by the invention of a mirror in which the substrate is provided on its front with a high refractive index dielectric UV reflective layer of a thickness such that it acts as a reflection enhancing interference layer for the near UV region.

Advantageous developments are the subject of other features of the invention in a mirror characterized by the fact that the UV reflective layer possesses a refractive index in the near UV region of at least 2.5, preferably at least 3.0.

Another feature of the invention resides broadly in a mirror characterized by the fact that the U reflective layer is designed as quarter-wavelength layer for a wavelength of approximately 290 nm.

Still another feature of the invention resides in a mirror characterized by the fact that the UV reflective layer consists of a dielectric which is practically absorption-free in the wavelength region of approximately 400 to 2,500 nm.

Another feature of the invention resides broadly in a mirror characterized by the fact that the UV reflective layer has a predominant content of $TiO_2$.

Yet another feature of the invention resides in a mirror characterized by the fact that the UV reflective layer has been applied by means of magnetron cathode sputtering.

A preferred process for manufacture of curved mirrors according to the invention is the subject of yet other features of the invention residing in a process for manufacture of a mirror with a curved substrate characterized by the following stages of manufacture: a preliminary metal layer is applied to the plane substrate, the substrate provided with the preliminary metal layer is bent in an oxygenous atmosphere, the preliminary layer becoming oxidized thereby converting it to the dielectric UV reflective layer, onto the back of the curved substrate is applied the silver reflective layer and the protective coating.

Still another feature of the invention resides in a process characterized by the fact that the application of the preliminary metal layer is carried out by means of vacuum coating.

Another feature of the invention resides in the process characterized by the fact that the preliminary layer is applied by means of magnetron cathode sputtering.

Mirrors according to the invention are used to special advantage for utilization of solar energy by means of chemical transformation processes residing in the use of a mirror for utilization of solar energy by means of chemical transformation processes.

It is admittedly basically known for dielectric layers such as $TiO_2$ to be used for solar mirrors as in European Patent Publication EP-B 0 024 900. They serve there however solely for ageing protection of the aluminum or silver reflective layer located there preferably on the front of the substrate. The advantageous properties of a solar mirror with a configuration in accordance with the invention with rear location of the silver reflective layer and front location of a UV reflective layer of defined thickness has evidently not been recognized before.

It is to be evaluated as surprising that provision of an interference layer matched to the near UV region on the front of the mirror substrate does not substantially reduce the reflection factor of the mirror in the visible region of the spectrum and in the IR region and thus the invention increases the already extremely high reflection factor of the mirror of the generic type for the entire wavelength region of the solar energy spectrum still further. The increase of the reflection factor in the near UV region to 40% and more is of special significance for the use of the mirror according to the invention for solar chemical processes.

If $TiO_2$ is used for the front UV reflective layer, this leads to an especially high ageing resistance of the mirror and, on account of the particularly high refractive index of $TiO_2$, to a considerable increase of the reflection factor in the near UV region. When applying the $TiO_2$ layer, is should be ensured that, to reduce the UV absorption factor, as complete oxidation as possible takes place to form the stoichiometric oxide.

The mirror according to the invention can be produced cost-effectively, as, to increase the reflection factor in the near UV region, it is only necessary to apply one additional thin layer on the glass substrate. If this is done by means of the magnetron cathode sputtering process widely used for quasi-continuous large area coating, extremely low additional costs can be achieved in comparison with conventional mirrors. In the case of curved mirrors, in particular parabolic mirrors, it is especially advantageous according to the invention to initially apply a preliminary metal layer to the still plane glass substrate, to then bend the latter while oxidizing the metal to form a dielectric and finally to carry out the silvering, as the application of metallic layers can be carried out more simply and at a higher rate than the application of a metallic oxide layer. The dielectric layers thus obtained are in addition more resistant to ageing than layers of the same structure which have not been heat treated.

The use according to the invention of claimed mirrors for solar chemical applications gives these mirrors a very special advantage over mirrors in accordance with the state of the art, as—as described above—in the case of these applications the high energy solar radiation in the near UV region is especially important, the efficiency of a solar chemical system equipped with mirrors according to the invention for utilization of solar energy is therefore significantly increased.

An aspect of the invention relates to a mirror for gathering and reflecting solar energy in a system for being powered by solar energy, the mirror comprising a glass substrate through which solar energy is transmitted, the glass substrate having a first side for gathering solar energy and a second side opposite the first side, a reflective layer for reflecting the solar energy gathered by the first side being transmitted through the glass substrate to the second side, the reflective layer being disposed on the second side of the glass substrate for reflecting solar energy back through the glass substrate and out the first side of the glass substrate, an interference layer being configured to be reflective to near ultraviolet radiation to interfere with near ultraviolet radiation falling on the mirror to substantially reduce near ultraviolet radiation transmitted to the glass substrate and substantially enhance reflection of near ultraviolet radiation from the mirror, the interference layer being configured to be substantially transparent to visible light and infrared radiation and the interference layer being disposed on the first side of the glass substrate.

Another aspect of the invention relates to a process for making a mirror for gathering and reflecting solar energy in a system for being powered by solar energy, the process comprising the steps of: forming a glass substrate through which solar energy is transmitted having a first side for gathering solar energy and a second side opposite side first side, forming a reflective layer for reflecting the solar energy gathered by the first side being transmitted through the glass substrate to the second side on the second side of the glass substrate for reflecting solar energy back through the glass substrate and out the first side of the glass substrate, forming an interference layer, on the first side of the glass substrate, being configured for reflecting near ultraviolet radiation to interfere with near ultraviolet radiation falling on the mirror to substantially reduce near ultraviolet radiation transmitted to the glass substrate and to be substantially transparent to visible light and infrared radiation and substantially enhance reflection of near ultraviolet radiation from the mirror.

Yet another aspect of the invention is a solar chemical process comprising: providing a reactor for performing a chemical process, providing a solar mirror for gathering and reflecting solar energy comprising a glass substrate through which solar energy is transmitted; the glass substrate having a first side for gathering solar energy and a second side opposite the first side, a reflective layer for reflecting the solar energy gathered by the first side being transmitted through the glass substrate to the second side, the reflective layer being disposed on the second side of the glass substrate for reflecting solar energy back through the glass substrate and out the first side of the glass substrate; an interference layer being configured for reflecting near ultraviolet radiation to interfere with near ultraviolet radiation falling on the mirror to substantially reduce near ultraviolet radiation transmitted to the glass substrate and substantially enhance reflection of near ultraviolet radiation from the mirror, the interference layer being disposed on the first side of glass substrate and reflecting solar radiation from said mirror to said reactor and performing the chemical process and providing apparatus for holding the solar mirror, holding the solar mirror in the means for holding, providing apparatus for controlling the apparatus for holding the solar mirror to direct solar energy from the sun to the reactor, controlling the position of the solar mirror by the controlling apparatus, and reflecting solar radiation from the mirror to the reactor and performing the chemical process.

DESCRIPTION OF THE DRAWINGS

The invention is explained below with the aid of Figures. These show.

DESCRIPTION OF THE PREFERRED EMBODIMENTS

Figure 1:
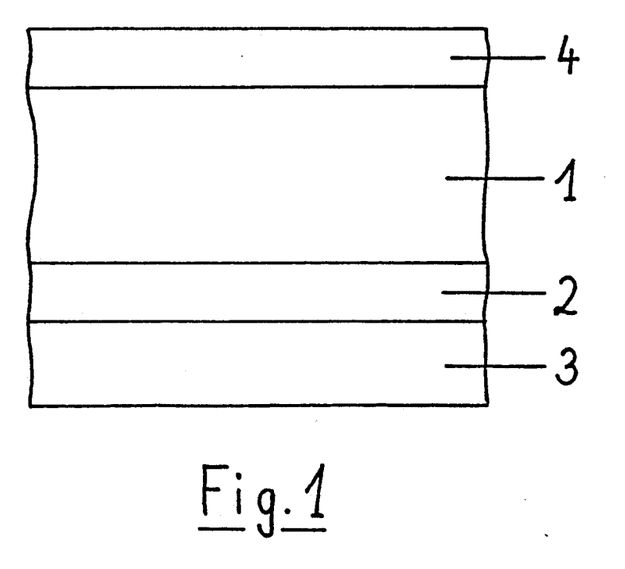
FIG. 1 the sectional view of an embodiment of the mirror according to the invention, FIG. 2 the spectral characteristic of the reflection factor of a mirror according to the invention as well as of a mirror of the generic type in the near UV region and FIG. 3 a view in accordance with FIG. 2 for the spectral region extended up to 2,500 nm.

The mirror shown in FIG. 1 consists of a substrate 1 of low absorption flat glass, in particular of iron reduced flat glass, so-called "white glass". The glass used for the substrate 1 such a "white glass" preferably is made of flat glass such as float glass having a particularly high degree of solar energy transmission and a color-neutral transparency compared to conventional, slightly green sodium-calcium-silicate glass. The green color in standard glass is caused by iron impurities. The glass of the substrate 1 is therefore a low-iron, high energy transmission silicate glass which can be termed high transmission glass or low absorption glass, or high energy transmission glass which has a low iron content.

Examples of high transmission glasses for use in solar applications are found in U.S. Pat. No. 4,298,389 entitled "High Transmission Glasses for Solar Applications." The thickness of the substrate 1 is usually some millimetres. Substrate 1 can if necessary be chemically or thermally toughened. If the mirror is intended to focus the solar radiation, the substrate 1 can be curved, for example parabolically.

On the back of the substrate 1 facing away from the sun, there is an opaque reflective layer 2 of silver, which is covered with a protective coating 3. The reflective layer 2 is generally applied by a wet chemical process in the interest of cost-effectiveness. It is also possible however to produce it by other coating processes. To achieve maximum reflection factor in the visible and IR region of the spectrum, the reflective layer 2 consists of silver, to which if necessary minor quantities of other metals can be added.

The protective coating 3 is generally formed by an initial layer of copper and a second layer of a varnish.

Figure 2:
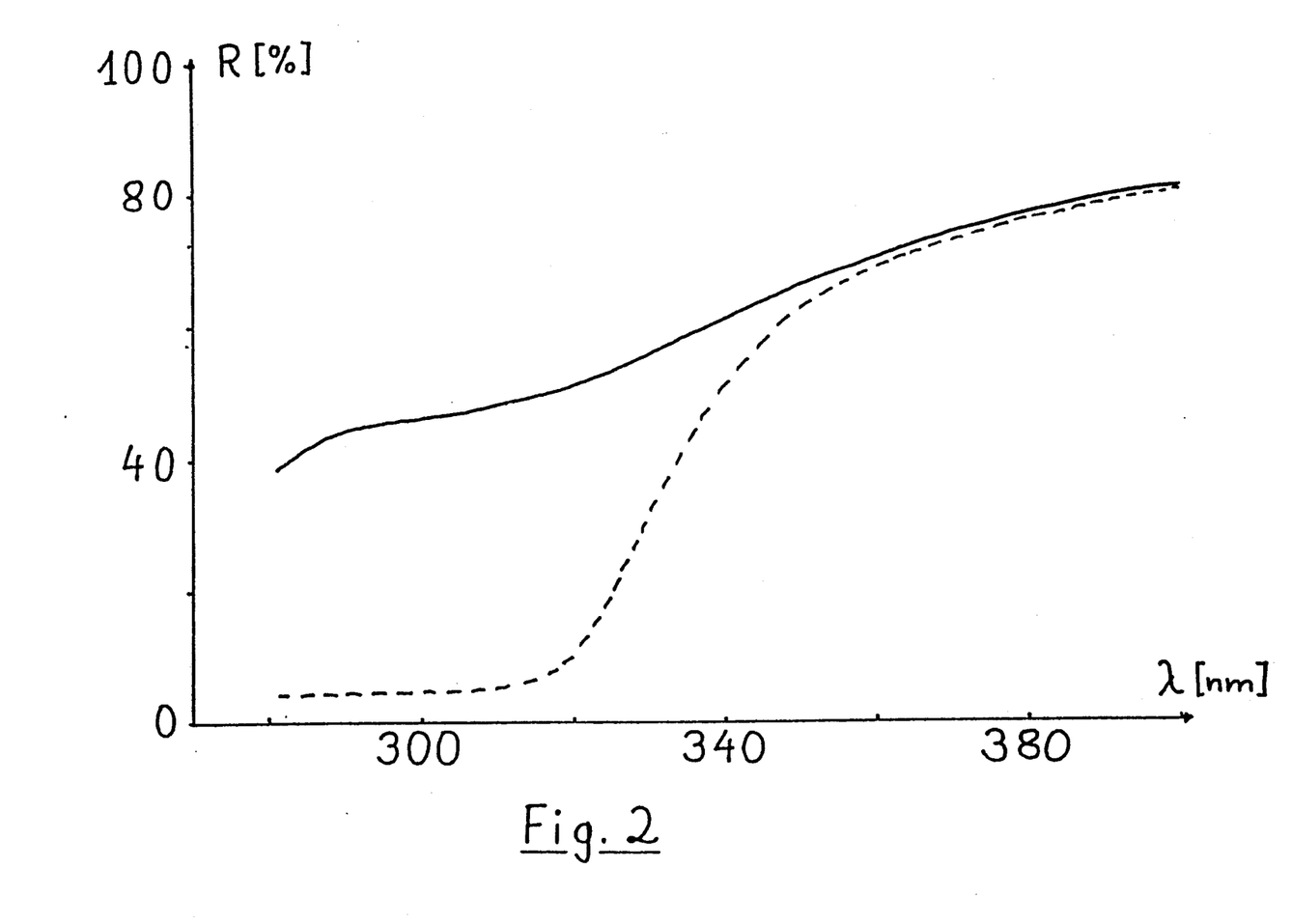
Figure 3:
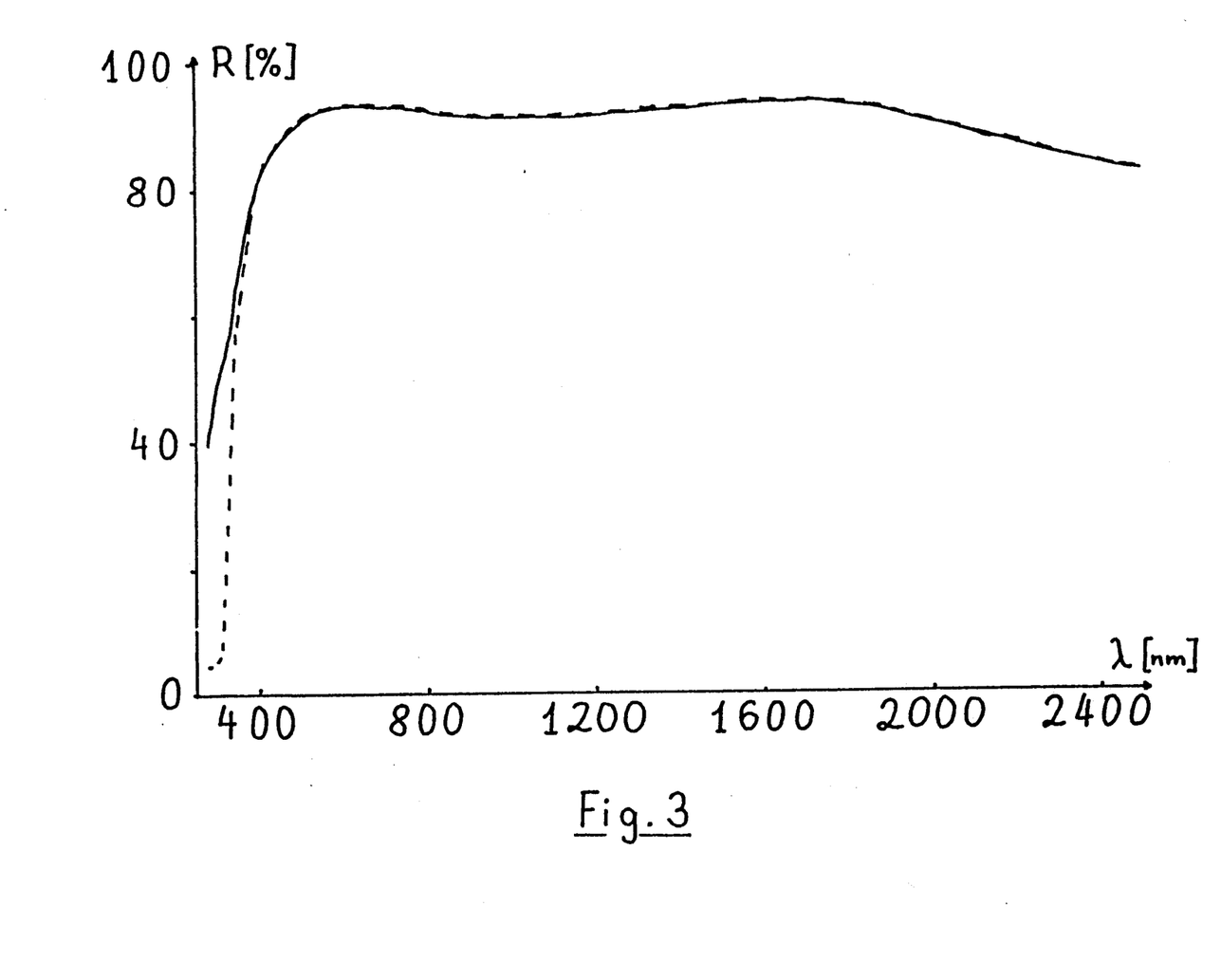

The spectral characteristic of the reflection factor of such a mirror is shown in FIGS. 2 and 3 as a dotted curve. FIG. 2 shows the UV region especially important for the invention, whilst FIG. 3 covers practically the entire region of the spectrum from the UV to the IR region significant for solar energy utilization.

FIGS. 2 and 3 show that the reflection factor of a mirror of this type is above 80% in almost the entire visible and IR region, and is mostly even above 90%. In the region below approximately 500 nm, the reflection factor drops sharply with decreasing wavelength down to less than 10% below approximately 320 nm. This drastic reduction in the reflection factor is attributable to absorption both in the glass of the substrate 1 and in the silver layer 2, which in this respect possess a correlating spectral characteristic which is in itself thoroughly desirable for optimizing utilization of solar energy.

The disadvantageous practically complete absence of reflection of solar energy in the high energy near UV region is eliminated according to the invention by an additional UV reflective layer 4 being placed on the front of the substrate 1 facing towards the sun. This layer consists of a high refractive index dielectric and is of a thickness such that it acts as reflection enhancing interference layer for the near UV region. Dielectrics are used as particular materials with a refractive index of at least 2.5, preferably at least 3.0. Layers of $TiO_2$ have been found particularly suitable, in spite of increasing absorption with decreasing wavelength.

The optical thickness of the UV reflective layer is, taking into account phase changes at the boundary surfaces involved, preferably a quarter-wavelength with the reference wavelength of approximately 290 nm.

The spectral characteristic of the reflection factor of a mirror according to the invention is represented in FIGS. 2 and 3 as a continuous curve. Particularly in FIG. 2, the increase of the reflection factor in the near UV region in comparison with the mirror of the generic type is clearly apparent. Thus, the UV reflection factor in the region from 280–340 nm is increased from 32% to 54% if, according to the invention, a UV reflective layer 4 of $TiO_2$ is applied to the front of the mirror. In the region of 280–320 nm, the effect of the UV reflective layer 4 (an increase from approximately 5% to approximately 43%) is even more drastic.

In addition, the overall solar reflection factor, measured in accordance with the CIE standard, increases from the already extremely high 91% to 92% if one proceeds in accordance with the invention. The fact that the additional layer does not lead to undesirable losses in other regions of the spectrum is shown in FIG. 3. Accordingly, the spectral characteristic of the reflection factor of a mirror according to the invention coincides almost completely with that of the conventional mirror above approximately 360 nm.

In the following example the mirror according to the invention and a preferred method of production are explained further in greater detail.

EXAMPLE

Onto a plane float glass pane measuring 40 cm * 40 cm, consisting of low-iron white glass, 4 mm thick, a preliminary metal layer of titanium 14 nm thick was first of all applied by sputtering a titanium target in an argon atmosphere of $2 * 10^{-3}$ mBar in a magnetron cathode sputtering plant.

The coated glass pane was then tempered in a heat treatment furnace in air at approximately 650° C. for 10 minutes. This heat treatment corresponds approximately to the thermal condition which occur when bending parabolic mirror glass panes. The titanium layer oxidized completely during this treatment to become $TiO_2$. The thickness of the layer 4 thus produced was 24 nm.

Subsequently, the back of the glass pane 1 was provided in known manner by wet chemical means with a silver reflective layer 2, which was then covered with a double layered protective coating 3 of Cu and varnish.

The mirror thus completed possessed a high degree of resistance to scratching and to moisture. The reflection factor of the mirror in the near UV region, that is to say between 280 and 340 nm, was 54%, the overall solar reflection factor was 92%. Thus, the mirror was particularly suitable for use in plants for utilization of solar energy by means of chemical transformation processes.

An example of a method of coating a substrate is found in U.S. Pat. No. 4,497,700 entitled "Method of Coating a Transparent Substrate." Some examples of inorganic glass are found in U.S. Pat. No. 4,943,957 and 4,948,760. Some examples of reactors in which the mirror of the present invention is applicable are U.S. Pat. No. 4,706,651 entitled "Solar Solids Reactor" and U.S. Pat. No. 4,229,184 entitled "Apparatus and Method for Solar Coal Gasification."

An example of methods of toughening and/or bending glass are found in U.S. Pat. No. 4,995,895, entitled "Process for the Manufacture of a Toughened and/or Bent Sheet of Glass With a Silver Coating."

Some publications which may be of interest are as follows:
Zeitschrift for Physik, Bd 156, 1959 P.117–124:
Journal Optical-Society of America, Vol. 46, No-12, December 1956, P.1013–1015;
DE-PS 970 607; and
DE 39 02 596 Al.

One feature of the invention resides broadly in a mirror for systems for utilization of solar energy, with substrate of low absorption flat glass and a rear highly reflective silver reflective layer which is provided with a protective coating, characterized by the fact that the substrate 1 is provided on its front with a high refractive index dielectric UV reflective layer 4 of a thickness such that it acts as a reflection enhancing interference layer for the near UV region.

Another feature of the invention resides in a mirror characterized by the fact that the UV reflective layer 4 possesses a refractive index in the near UV region of at least 2.5, preferably at least 3.0.

Yet another feature of the invention resides broadly in a mirror characterized by the fact that the UV reflective layer 4 is designed as quarter-wavelength layer for a wavelength of approximately 290 nm.

Still another feature of the invention resides in a mirror characterized by the fact that the UV reflective layer 4 consists of a dielectric which is practically absorption-free in the wavelength region of approximately 400 to 2,500 nm.

Another feature of the invention resides broadly in a mirror characterized by the fact that the UV reflective layer 4 has a predominant content of $TiO_2$.

Yet another feature of the invention resides in a mirror characterized by the fact that the UV reflective layer 4 has been applied by means of magnetron cathode sputtering.

Another feature of the invention resides in a process for manufacture of a mirror with a curved substrate 1 characterized by the following stages of manufacture:

(a) a preliminary metal layer is applied to the plane substrate 1, (b) the substrate 1 provided with the preliminary metal layer is bent in an oxygenous atmosphere, the preliminary layer becoming oxidized thereby converting it to the dielectric UV reflective layer 4, (c) onto the back of the curved substrate 1 is applied the silver reflective layer 2 and the protective coating 3.

Still another feature of the invention resides in a process characterized by the fact that the application of the preliminary metal layer is carried out by means of vacuum coating.

Another feature of the invention resides in the process characterized by the fact that the preliminary layer is applied by means of magnetron cathode sputtering.

Yet another feature of the invention resides in the use of a mirror for utilization of solar energy by means of chemical transformation processes.

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The details in the patents, patent applications, and publications may be considered to be incorporable in any combination, at applicant's option, into the claims during prosecution as further limitations in the claims to patentably distinguish any amended claims from any applied prior art.

The invention as described hereinabove in the context of the the preferred embodiments is not to be taken as limited to all of the provided details thereof, since modifications and variations thereof may be made without departing from the spirit and scope of the invention.

What is claimed is:

1. A mirror for gathering and reflecting solar energy in a system for being powered by solar energy, said mirror comprising:
   a glass substrate through which solar energy is transmitted;
   said glass substrate having a first side for gathering solar energy and a second side opposite said first side;
   a reflective layer for reflecting the solar energy gathered by said first side being transmitted through said glass substrate to said second side, said reflective layer being disposed on said second side of said glass substrate for reflecting solar energy back through said glass substrate and out said first side of said glass substrate;
   an interference layer being configured to be reflective to near ultraviolet radiation to interfere with near ultraviolet radiation falling on said mirror to substantially reduce near ultraviolet radiation transmitted to the glass substrate and substantially enhance reflection of near ultraviolet radiation from the mirror;
   said interference layer being configured to be substantially transparent to visible light and infrared radiation: and
   said interference layer being disposed on said first side of said glass substrate.

2. The mirror according to claim 1, wherein said interference layer comprises a dielectric layer having a high refractive index in the near ultraviolet range.

3. The mirror according to claim 2, wherein said reflective layer comprises a highly reflective silver layer.

4. The mirror according to claim 2, wherein said glass substrate comprises a glass with high transmission characteristics in the visible and infrared ranges.

5. The mirror according to claim 1, wherein said reflective layer comprises a highly reflective silver layer.

6. The mirror according to claim 5, wherein said glass substrate comprises a glass with high transmission characteristics in the visible and infrared ranges.

7. The mirror according to claim 1, wherein said glass substrate comprises a glass with high transmission characteristics in the visible and infrared range.

8. The mirror according to claim 1, wherein said interference layer is configured to have a thickness to interfere with near ultraviolet radiation falling on said mirror to substantially reduce near ultraviolet radiation transmitted to the glass substrate and substantially enhance reflection of near ultraviolet radiation from the mirror.

9. The mirror according to claim 8, wherein said interference layer has a refractive index being at least 2.5.

10. The mirror according to claim 9, wherein said interference layer has a refractive index being at least 3.0.

11. The mirror according to claim 8, wherein said interference layer comprises a layer being about one quarter wavelength thick for a near ultraviolet wavelength of about 290 nanometers.

12. The mirror according to claim 1, wherein said interference layer comprises a dielectric being substantially radiation absorption free in the wavelength range of solar radiation of about 400 nanometers to about 2,500 nanometers.

13. The mirror according to claim 1, wherein said interference layer comprises predominantly titanium dioxide.

14. The mirror according to claim 1, wherein said interference layer comprises a layer applied by magnetron cathode sputtering.

15. The mirror according to claim 1, wherein said interference layer comprises a sole layer applied on said first side of said substrate.

16. The mirror according to claim 1, wherein said glass substrate comprises float glass.

17. The mirror according to claim 16, wherein said glass substrate is configured to transmit visible light and infrared radiation.

18. A process for making a mirror for gathering and reflecting solar energy in a system for being powered by solar energy, said process comprising the steps of:
   forming a glass substrate through which solar energy is transmitted having a first side for gathering solar energy and a second side opposite side first side:
   forming a reflective layer for reflecting the solar energy gathered by said first side being transmitted through said glass substrate to said second side on said second side of said glass substrate for reflecting solar energy back through said glass substrate and out said first side of said glass substrate;
   forming an interference layer, on said first side of said glass substrate, being configured for reflecting near ultraviolet radiation to interfere with near ultraviolet radiation falling on said mirror to substantially reduce near ultraviolet radiation transmitted to the glass substrate and to be substantially transparent to visible light and infrared radiation and substantially enhance reflection of near ultraviolet radiation from the mirror.

19. The process according to claim 18 including the following additional steps:
   applying a metal layer to said substrate to subsequently form said interference layer;
   providing the glass substrate as a flat glass substrate:
   bending the flat glass substrate with the metal layer thereon in an atmosphere containing oxygen:
   oxidizing the metal layer to form the dielectric interference layer for reflecting near ultraviolet radiation; and
   applying a protective coating on the side of the reflective layer opposite said first side.

20. The mirror according to claim 19, wherein said forming of said metal layer comprises forming said metal layer in a vacuum.

21. The mirror according to claim 20, wherein said forming of said metal layer comprises sputtering said metal layer by magnetron cathode sputtering.

22. A solar chemical process comprising:
   providing a reactor for performing a chemical process;
   providing a solar mirror for gathering and reflecting solar energy comprising a glass substrate through which solar energy is transmitted; said glass substrate having a first side for gathering solar energy and a second side opposite said first side; a reflective layer for reflecting the solar energy gathered by said first side being transmitted through said glass substrate to said second side, said reflective layer being disposed on said second side of said glass substrate for reflecting solar energy back through said glass substrate and out said first side of said glass substrate; an interference layer being configured for reflecting near ultraviolet radiation to interfere with near ultraviolet radiation falling on said mirror to substantially reduce near ultraviolet radiation transmitted to the glass substrate and substantially enhance reflection of near ultraviolet radiation from the mirror, said interference layer being disposed on said first side of glass substrate;

providing means for holding the solar mirror;

holding said solar mirror in said means for holding:

providing means for controlling said means for holding the solar mirror to direct solar energy from the sun to said reactor;

controlling the position of said solar mirror by said controlling means; and reflecting solar radiation from said mirror to said reactor and performing said chemical process.

* * * * *

UNITED STATES PATENT AND TRADEMARK OFFICE
CERTIFICATE OF CORRECTION

PATENT NO. : 5,253,105

DATED : October 12, 1993

INVENTOR(S) : Thomas PAUL and Ingo SUSEMIHL

It is certified that error appears in the above-identified patent and that said Letters Patent is hereby corrected as shown below:

On the title page item (73) Assignee: after 'Aktiengesellschaft', delete "Fuerth" and insert --Fuerth/Bayern--.

In column 8, line 3, after 'Zeitschrift', delete "for" and insert --für--.

In column 9, line 53, Claim 7, after 'infrared', delete "range" and insert --ranges--.

Signed and Sealed this

Twenty-sixth Day of April, 1994

Attest:

BRUCE LEHMAN

Attesting Officer     Commissioner of Patents and Trademarks